(12) United States Patent
Jones et al.

(10) Patent No.: US 9,724,809 B2
(45) Date of Patent: Aug. 8, 2017

(54) APPARATUS AND METHOD FOR IMPACT FORMING A COTTER PIN

(71) Applicant: Bendix Spicer Foundation Brake LLC, Elyria, OH (US)

(72) Inventors: Jeffrey L Jones, Battle Creek, MI (US); Daniel Ennis, Franklin, KY (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 414 days.

(21) Appl. No.: 14/570,033

(22) Filed: Dec. 15, 2014

(65) Prior Publication Data

US 2016/0167209 A1      Jun. 16, 2016

(51) Int. Cl.
  *B25B 27/08*      (2006.01)
  *F16B 21/12*      (2006.01)

(52) U.S. Cl.
  CPC ............. *B25B 27/08* (2013.01); *F16B 21/12* (2013.01)

(58) Field of Classification Search
  CPC ......... B25B 27/08; B25B 19/00; F16B 21/12; Y10T 29/53683; Y10T 29/53796
  USPC ........... 81/463–466; 254/26 E, 26 R; 29/244, 29/255, 278; 269/32, 228
  See application file for complete search history.

(56) References Cited

U.S. PATENT DOCUMENTS

| | | | | |
|---|---|---|---|---|
| 1,516,877 A | * | 11/1924 | Anekee | B25B 27/08 72/403 |
| 1,751,013 A | * | 3/1930 | McMullen | F16B 21/12 301/113 |
| 2,330,013 A | * | 9/1943 | Schultz | B25B 27/08 29/247 |
| 2,345,141 A | | 3/1944 | McMullen | |
| 2,802,383 A | * | 8/1957 | Babyak | B25B 27/08 72/409.17 |
| 2,821,100 A | * | 1/1958 | Decker | B25B 27/08 72/383 |

(Continued)

FOREIGN PATENT DOCUMENTS

DE       2004989 B1 *  8/1971  ............. B25B 27/08

OTHER PUBLICATIONS

Translation DE 2004989 B1.*

(Continued)

*Primary Examiner* — Jason L Vaughan
*Assistant Examiner* — Amanda Meneghini
(74) *Attorney, Agent, or Firm* — Cheryl L. Greenly; Brian E. Kondas; Eugene E. Clair

(57) ABSTRACT

Various embodiments of an apparatus and method for impact forming a cotter pin in a brake assembly are disclosed. In one example, an impact forming tool comprises a handle for receiving an operating force, a stationary portion and a hammer portion. The stationary portion is connected to the handle at a proximate end. An orientation pin is positioned on a distal end and two anvil pins are positioned on the stationary portion between the proximate end and the orientation pin. The hammer portion communicates with the operating force and moves linearly across the face of the stationary portion from a first position to a second position. The hammer portion has a symmetrical arcuate end, wherein a vertex of the symmetrical arcuate end is between the two anvil pins when the hammer is in the second position.

19 Claims, 7 Drawing Sheets

(56) References Cited

U.S. PATENT DOCUMENTS

| | | | | |
|---|---|---|---|---|
| 2,854,874 A | * | 10/1958 | Decker | B25B 27/08 |
| | | | | 29/243.5 |
| 3,153,357 A | * | 10/1964 | Decker | B25B 27/08 |
| | | | | 72/409.13 |
| 4,356,718 A | | 11/1982 | Makino | |
| 4,844,211 A | | 7/1989 | Nosse | |
| 4,995,274 A | | 2/1991 | Kleeman | |
| 5,152,652 A | * | 10/1992 | Nadherny | F16B 21/12 |
| | | | | 411/364 |
| 5,819,580 A | | 10/1998 | Gauthier | |
| 6,604,395 B2 | | 8/2003 | Lee | |
| 2013/0047693 A1 | | 2/2013 | Fujita | |

OTHER PUBLICATIONS

European Patent Office, "Search Report and Written Opinion of the International Searching Authority," Mar. 23, 2016, 11 pages, Rijawik Netherlands.

* cited by examiner

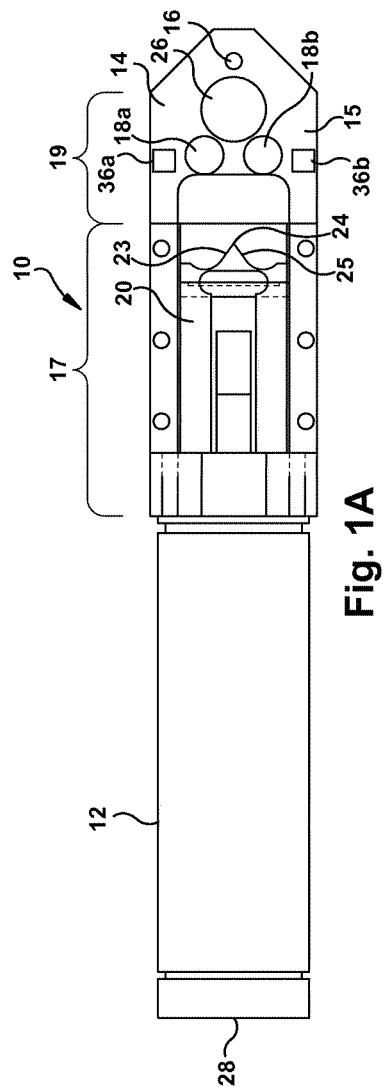
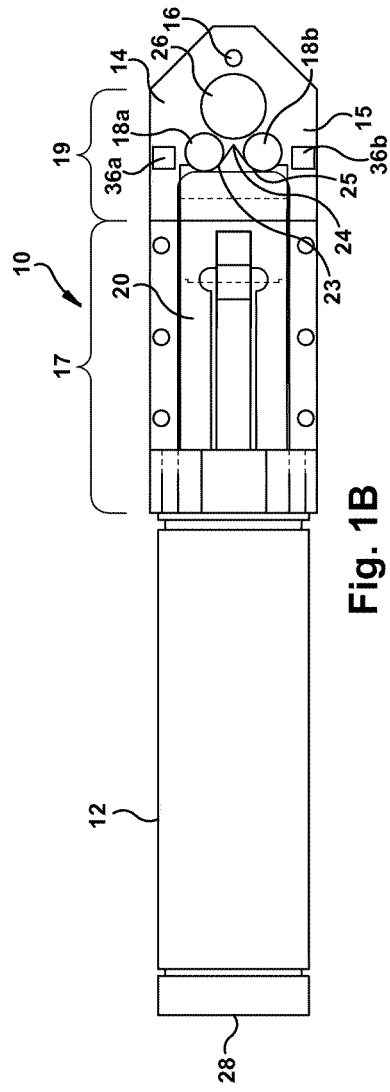
Fig. 1A
Fig. 1B

APPARATUS AND METHOD FOR IMPACT FORMING A COTTER PIN

BACKGROUND

The present invention relates to embodiments of an apparatus and method for forming a cotter pin. Cotter pins are generally metallic fasteners with two tines that are bent during installation. The cotter pin holds two different components together while allowing the two components to move or rotate with respect to each other. In one example, a first of the two components is inserted through a second component and the cotter pin is inserted into an aperture in the first component. The two tines are bent such that the cotter pin cannot be removed from the first component. An example of a commercial vehicle application for cotter pins includes inserting a cotter pin through a clevis pin and bending the cotter pin tines to connect a yoke to a slack adjuster via the clevis pin.

Several methods exist for bending the tines of a cotter pin. One common method is a manual method where the operator uses pliers to first grab one of the tines of the cotter pin and bend the pin outward away from the other tine. Then the operator grabs the second tine of the cotter pin and bends the second tine in the opposite direction. Manual bending of the tines requires a twisting motion of the operator's wrist, which may cause ergonomic issues over long periods of repetitive motion. There is no automatic check in the process to confirm that the operator actually bent both tines. The bend may not have been complete enough to hold the cotter pin in the first component and the cotter pin may fall out of the first component.

Another method to bend cotter pins is the use of automatic tools. Automatic tools are typically rotational tools that grab one longer tine of the cotter pin and bend the longer tine first. Then the tool rotates again to grab the second shorter tine of the cotter pin to bend it in an opposite direction. These machines are generally large and are designed for applications where the cotter pin is easily accessible. The automatic machines require special types of cotter pins having one tine longer than the other.

SUMMARY

Various embodiments of an apparatus for impact forming a cotter pin are disclosed. In accordance with one example, the apparatus is a tool comprising a handle configured to receive an operating force, a stationary portion and a hammer portion. The stationary portion has a face and is connected to the handle at a proximate end portion. An orientation pin is positioned on a distal end portion of the face of the stationary portion and two anvil pins are positioned on the face of the stationary portion between the proximate end portion and the orientation pin. The hammer portion communicates with the source of operating force and is configured to move linearly across the face of the stationary portion from a first position to a second position. The hammer portion has a symmetrical arcuate end, wherein a vertex of the symmetrical arcuate end is between the two anvil pins when the hammer is in the second position.

In accordance with another aspect, a method for impact forming a cotter pin comprises inserting a cotter pin having a head and two tines into a securing pin aperture, wherein the tines of the cotter pin extend through the securing pin aperture. The method includes aligning an impact forming tool with the head of the cotter pin at an orientation pin on the impact forming tool wherein the orientation pin positions the cotter pin and aligning the impact forming tool wherein a securing pin fits through an alignment aperture in the impact forming tool. The method includes actuating the impact forming tool to move a hammer portion of the impact forming tool linearly along a face of a stationary portion of the impact forming tool where the hammer portion simultaneously separates the two tines of the cotter pin.

In accordance with another aspect, a system for securing an assembly with a cotter pin comprises a cotter pin with a head and two tines and an impact forming tool. The impact forming tool comprises a handle configured to receive an operating force; a stationary portion with a face and connected to the handle at the proximate end. The impact forming tool includes an orientation pin positioned on a distal end of the stationary portion for receiving the heat of the cotter pin and two anvil pins positioned on the stationary portion between the proximate end and the orientation pin. A hammer portion communicates with the operating force and is configured to move linearly across the face of the stationary portion from a first position to a second position. The hammer portion has a symmetrical arcuate end, wherein a vertex of the symmetrical arcuate end is positioned to separate the two tines of the cotter pin between the two anvil pins when the hammer is in the second position.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 1A illustrates a schematic representation of an impact forming tool in a first, or unactuated, position, according to an embodiment of the present invention.

FIG. 1B illustrates a schematic representation of an impact forming tool in a second, or actuated, position, according to an embodiment of the present invention.

DETAILED DESCRIPTION

Figure 2:
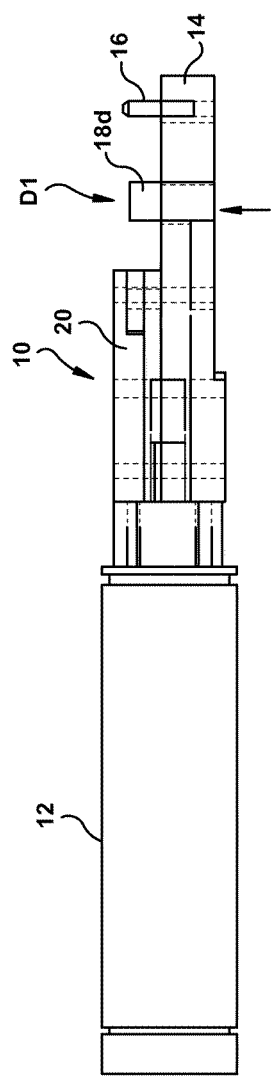
FIG. 2 illustrates a perspective view of the impact forming tool as in FIG. 1A, according to an embodiment of the present invention.

With reference to FIGS. 1A and 1B, an impact forming tool 10 for impact forming a cotter pin is illustrated. FIG. 1A illustrates the impact forming tool 10 in a first position and FIG. 1B illustrates the impact forming tool 10 in a second position.

The impact forming tool 10 comprises a handle 12. The handle 12 is configured to be held by an operator's hand during operation of the impact forming tool 10. The handle 12 is configured for receiving an operating force (not shown) at the operating force input 28. The operating force may be actuated at the handle 12 or remotely from the impact forming tool 10. The source of the operating force may be pneumatic, hydraulic, electrical or manual. The source of the operating force is to be capable of delivering between 120 pounds and 300 pounds of force.

The impact forming tool 10 comprises a stationary portion 14. The stationary portion 14 has a face 15. The stationary portion 14 is connected to the handle 12 at a proximate end portion 17. The stationary portion 14 includes an orientation pin 16 positioned on the face 15 at a distal end portion 19. The stationary portion 14 also includes two anvil pins 18a, 18b positioned on the face 15 of the stationary portion 14 between the proximate end portion 17 and the orientation pin 16. The stationary portion 14 also comprises an alignment aperture 26 positioned between the orientation pin 16 and the two anvil pins 18a, 18b.

The impact forming tool 10 comprises a hammer portion 20. The hammer portion 20 is in communication with the source of operating force at the handle 12. The hammer portion 20 has a symmetrical arcuate end having a first arcuate portion 23 and a second arcuate portion 25. The first arcuate portion 23 and second arcuate portion 25 meet to form an angle at a vertex 24.

The hammer portion 20 is configured to move linearly across the face 15 of the stationary portion 14 from a first position shown in FIG. 1A to a second position shown in FIG. 1B. In the first, or open, position, the impact forming tool 10 is capable of receiving an unbent cotter pin (not shown). In the second, or closed, position, the vertex 24 of the hammer portion 20 is positioned between the two anvil pins 18a, 18b, thereby impacting the unbent cotter pin and forming the cotter pin tines.

The impact forming tool 10 may also comprise at least one sensor 36a, 36b on the stationary portion 14. The at least one sensor 36a, 36b may be an optical device or a switching device for determining the presence and angle of bending of a cotter pin, as will be described.

In FIG. 2, a side view of the impact forming tool 10 in the first position is illustrated. The dimension D1 of the stationary portion 14 is about 0.5 inches. In another example, the dimension D1 is between about 0.25 inches and 0.75 inches.

Figure 3:
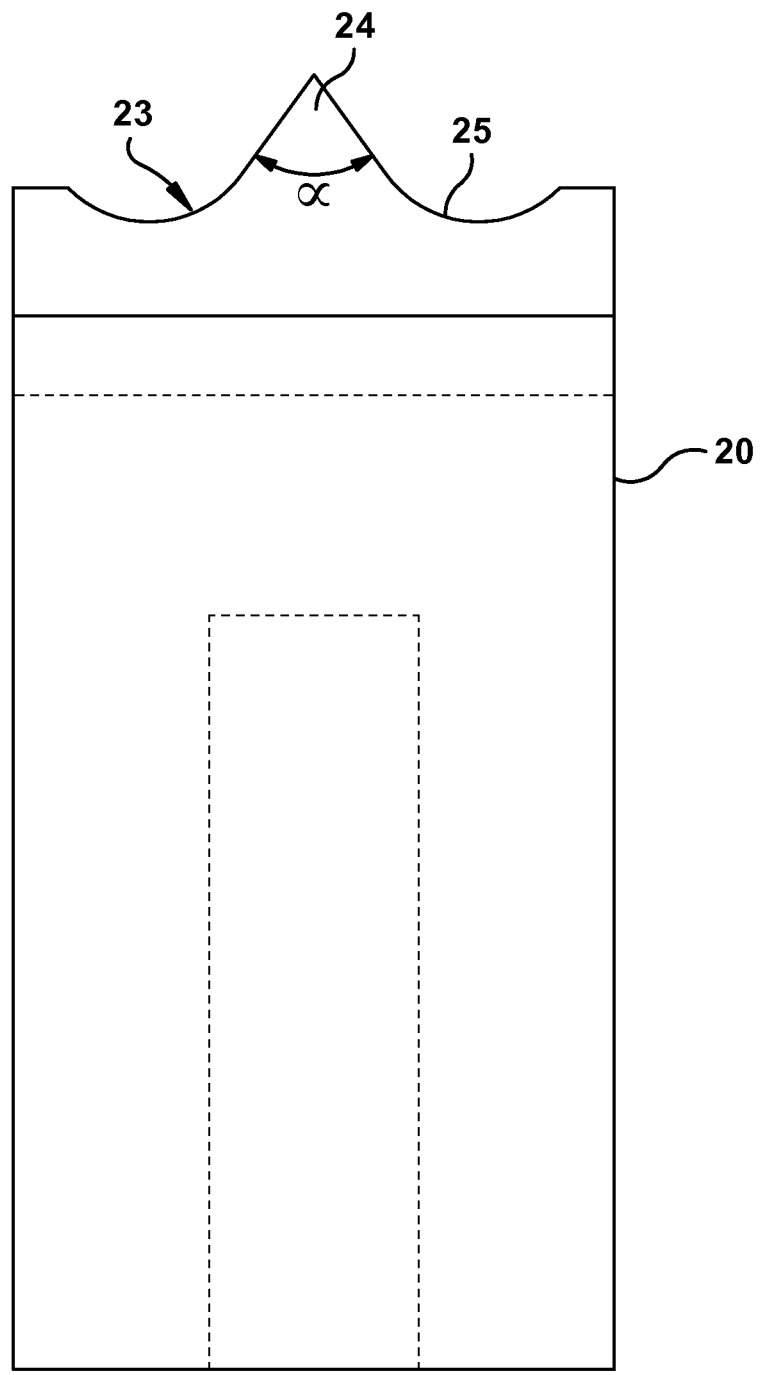
FIG. 3 illustrates a hammer portion of the impact forming tool.

FIG. 3 illustrates a view of the hammer portion 20 only. The first arcuate portion 23 and the second arcuate portion 25 meet at vertex 24 and form angle alpha α. In one example, angle alpha α is between thirty (30) degrees and sixty (60) degrees. In another example, angle alpha α is about 45 degrees.

Accordingly, a tool for impact forming a cotter pin comprises a handle configured to receive an operating force. The tool includes a stationary portion having a face and connected to the handle at a proximate end portion. The stationary portion has an orientation pin positioned on a distal end of the face and two anvil pins between the proximate end portion and the orientation pin. The tool includes a hammer portion communicating with the source of operating force. The hammer portion is configured to move linearly across the face of the stationary portion from a first position to a second position. The hammer portion has a symmetrical arcuate end, wherein a vertex of the symmetrical arcuate end is between the two anvil pins when the hammer is in the second position.

Figure 4A:
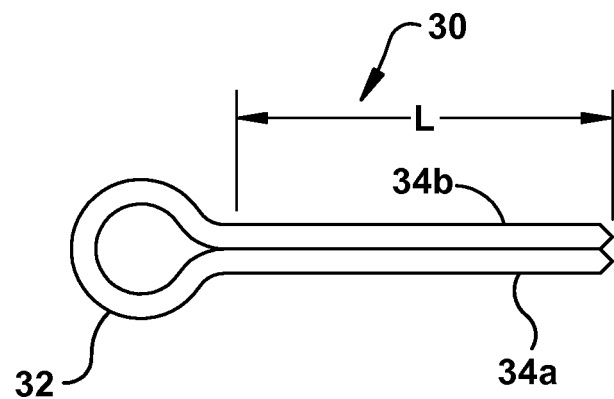
FIG. 4A illustrates a cotter pin.

In FIG. 4A, a cotter pin 30 as would be received for manufacturing purposes is shown. The cotter pin 30 is a single piece that includes a head 32 and two tines 34a, 34b. The cotter pin 30 may be a metallic material, such as steel or aluminum. The tines 34a, 34b have a length L. Length L is the same for tines 34a, 34b. The tines 34a, 34b may be beveled at the ends.

Figure 4B:
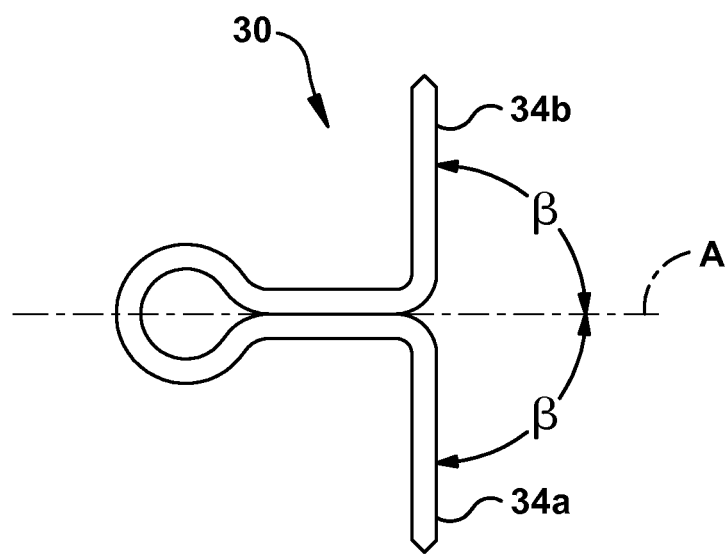
FIG. 4B illustrates the cotter pin of FIG. 4A after impact forming.

In FIG. 4B, the cotter pin 30 is shown after being bent by the impact forming tool 10 of the present invention. Tine 34a forms an angle beta β with respect to an axis A through the center of the cotter pin 30. In one example, the angle beta β is about ninety (90) degrees. When the tine 34a is at a bend angle beta β of about ninety degrees significant force is required to un-bend the cotter pin tine 34a. Tine 34b would be similarly bent to an angle beta β simultaneously during the impact forming process.

Figure 5:
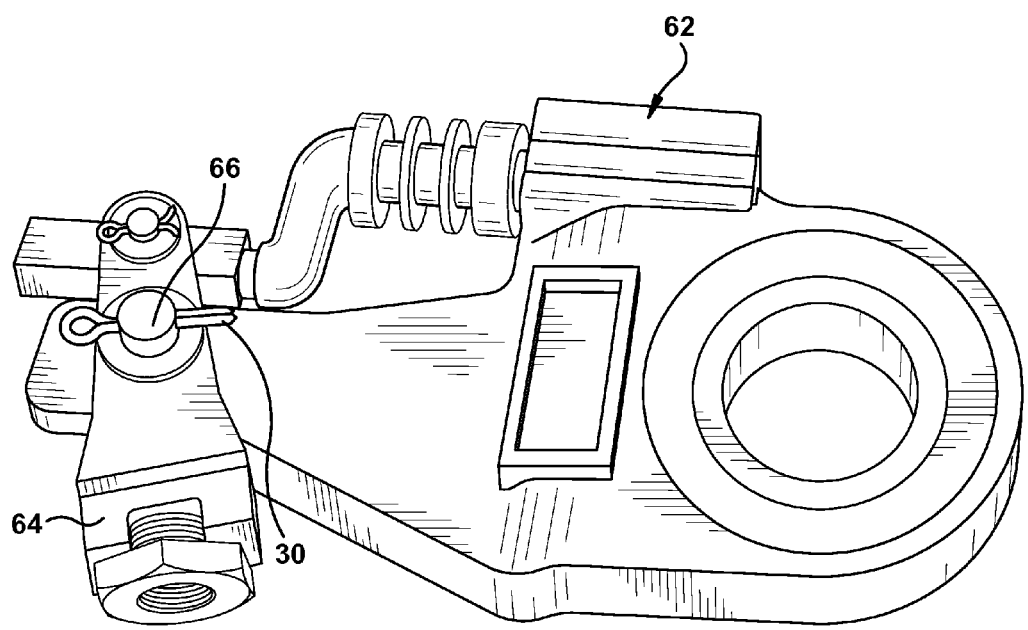
FIG. 5 illustrates a cotter pin in a slack adjuster assembly.

FIG. 5 shows a slack adjuster 62 for use in a brake assembly. It is desired to hold a yoke 64 to the slack adjuster 62 while allowing linear and rotational movement of the yoke 64. A securing pin 66, such as clevis pin, is inserted in apertures in both the slack adjuster 62 and the yoke 64. The cotter pin 30 is then inserted through an aperture in the securing pin 66. The cotter pin 30 is then ready for bending by the impact forming tool 10.

Figure 6:
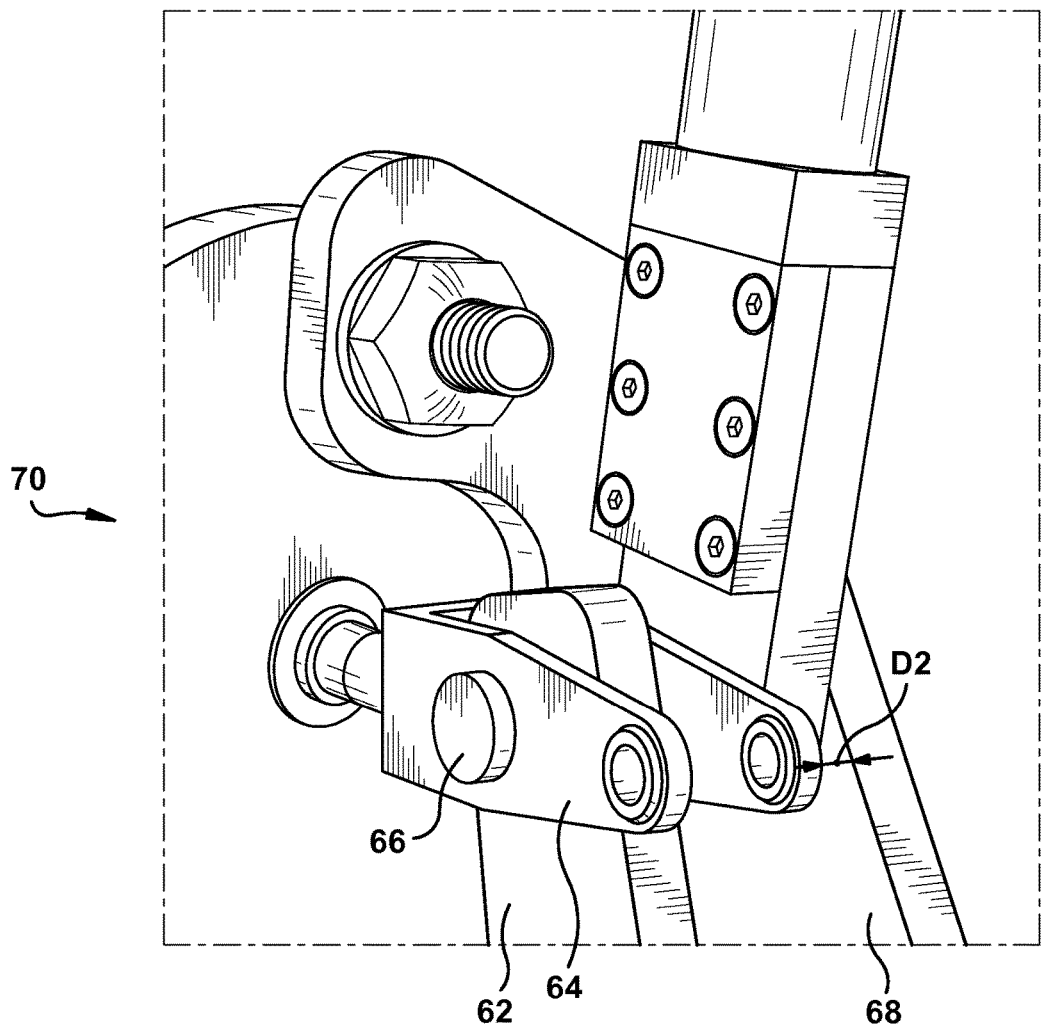
FIG. 6 illustrates the impact forming tool being used in a slack adjuster assembly according to an embodiment of the present invention.

A brake assembly 70 using slack adjuster 62 is shown in FIG. 6. In this example, the slack adjuster 62 is mounted to a bracket 68 prior to the yoke 64 being attached. The securing pin 66 is inserted in the apertures in the yoke 64 and the slack adjuster 62. The cotter pin 30 (not visible) is inserted in the aperture in the securing pin 66 such that the tines 34a, 34b are oriented upwards.

In this example, a distance D2 between the bracket 68 and the slack adjuster 62 is less than about one (1) inch. Since there is a limited space in which the impact forming tool 10 can be inserted between the bracket 68 and the slack adjuster 62, the thickness D1 of the stationary portion 14 of about 0.5 inches supports fitting the impact forming tool 10 into the desired space.

Additionally, the operator aligns the orientation pin 16 with the head 32 of the cotter pin 30. The operator also aligns the aperture 26 with the securing pin 66. In this manner, the impact forming tool 10 orients the cotter pin 30 in a consistent longitudinal and angular position prior to impact. In addition, the cotter pin 30 cannot rotate while being impact formed.

Figure 7:
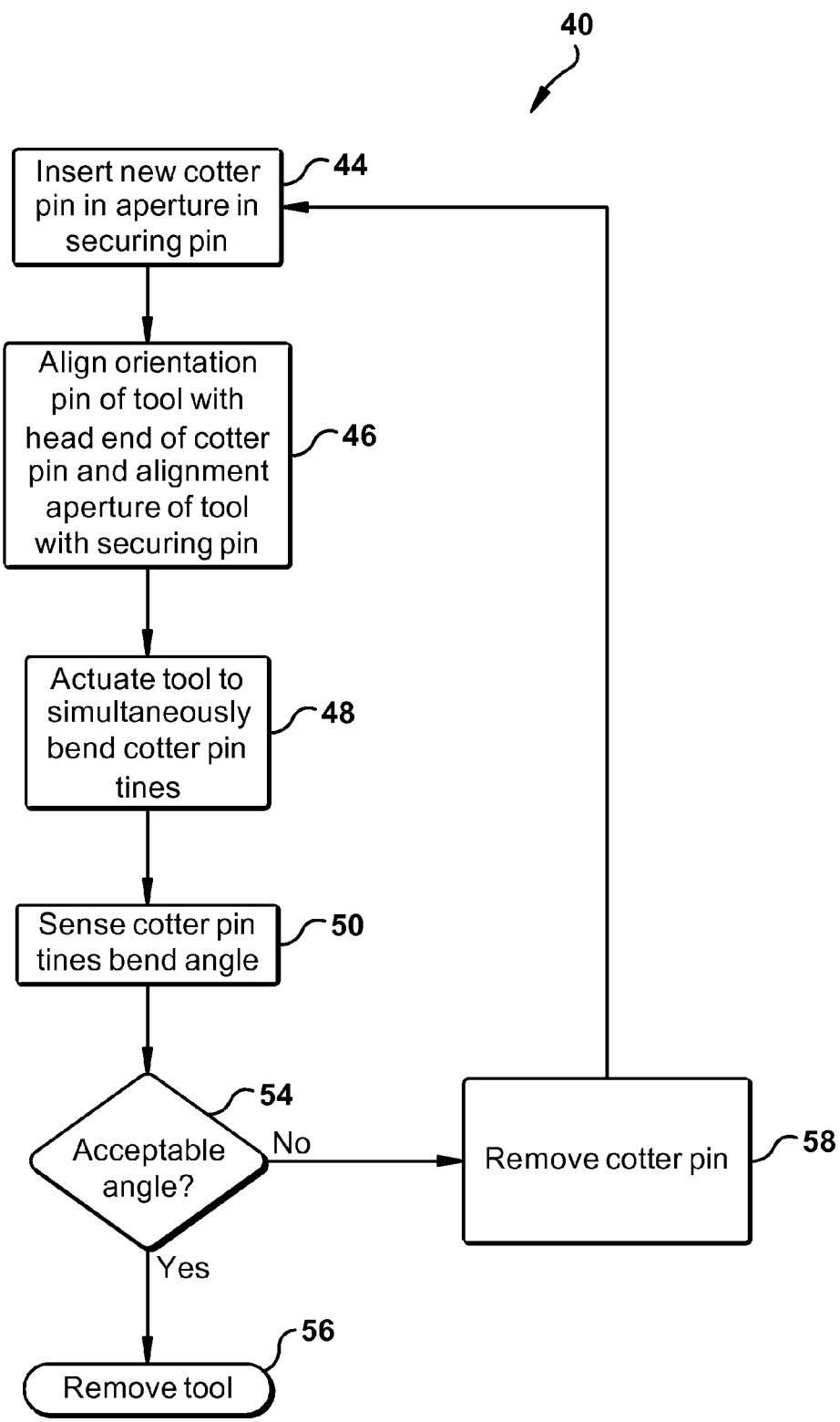
FIG. 7 illustrates a method of impact forming a cotter pin according to an embodiment of the present invention.

A flowchart for implementing a method 40 of impact forming a cotter pin in a brake assembly is shown in FIG. 7. In step 44, a new cotter pin 30 is inserted in the aperture in the securing pin 66. In step 46, the orientation pin 16 of the tool 10 is aligned with the head 32 of the cotter pin 30. The alignment aperture 26 of the tool 10 is aligned with the securing pin 66 so that the securing pin 66 extends through the alignment aperture 26.

In step 48, the impact forming tool 10 is actuated so that the hammer portion 20 moves linearly across the face 15 of the stationary portion 14 from a first position to a second position for impact forming the cotter pin 30. The symmetrical arcuate ends 23, 25 of the hammer portion 20 separate the tines 34a, 34b. The tines 34a, 34b of the cotter pin 30 are bent simultaneously between the anvil pins 18a, 18b and the symmetrical arcuate end of the hammer portion 20. The angle α of about 45 degrees formed by the arcuate portion 23 and arcuate portion 25 of the hammer portion 20 is selected to bend the tines 34a, 34b each to an angle β of about ninety (90) degrees. A different angle α may be selected to bend the tines 34a, 34b to a different angle β. The impact forming tool 10 does not require the tines 34a, 34b to be of a different length or shape.

In step 50, the sensors 36a, 36b determine the presence and the bend angle of the tines 34a, 35b. In step 54, the determination of an acceptable angle is completed. The determination may be done by a controller (not shown) separate from the impact forming tool 10. The predetermined range of acceptable bend angles is from about 80 degrees to about 110 degrees. In one example, the acceptable bend angle is 90 degrees. If the bend angle β is acceptable in step 54, the operator is informed so he can remove the impact forming tool 10 from the brake assembly 70 in step 56. The impact forming operation is then complete.

If the bend angle is not acceptable in step 54, the operator is informed and he removes the cotter pin 30 in step 58 and restarts the method 40 again at step 44.

This apparatus and method for impact forming a cotter pin results in an easily usable handheld tool which provides more uniform bending of cotter pin tines for applications requiring cotter pin bending in a confined space.

Therefore a system for securing an assembly with a cotter pin comprises a cotter pin with a head and two tines and an impact forming tool. The impact forming tool comprises a handle configured to receive an operating force; a stationary portion with a face, a proximate end and a distal end, the stationary portion connected to the handle at the proximate end; an orientation pin positioned on a distal end of the stationary portion for receiving the heat of the cotter pin; two anvil pins positioned on the stationary portion between the proximate end and the orientation pin; and a hammer portion communicating with the source of operating pressure. The hammer portion is configured to move linearly across the face of the stationary portion from a first position to a second position; the hammer portion having a symmetrical arcuate end, wherein a vertex of the symmetrical arcuate end is positioned to separate the two tines of the cotter pin between the two anvil pins when the hammer is in the second position.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A tool for impact forming a cotter pin comprising:
   a handle configured to receive an operating force;
   a stationary portion having a face, the stationary portion connected to the handle at a proximate end portion;
   an orientation pin positioned on a distal end portion of the face of the stationary portion;
   two anvil pins positioned on the face of the stationary portion between the proximate end portion and the orientation pin; and
   a hammer portion communicating with the operating force; the hammer portion configured to move linearly across the face of the stationary portion from a first position to a second position in response to the operating force; the hammer portion having a symmetrical arcuate end, wherein a vertex of the symmetrical arcuate end is between the two anvil pins when the hammer is in the second position.

2. The tool as in claim 1, wherein the tool is a handheld tool.

3. The tool as in claim 1, wherein the operating force is one of a pneumatic force, a hydraulic force, an electrical force and a manual force.

4. The tool as in claim 1, wherein the orientation pin is configured for holding a head of an associated cotter pin and the vertex of the symmetrical arcuate end is configured for separating tines of the associated cotter pin when the hammer portion is in the second position.

5. The tool as in claim 4, wherein the stationary portion further comprises an alignment aperture for receiving an associated securing pin, the associated securing pin configured to receive the associated cotter pin, the alignment aperture positioned between the orientation pin and the two anvil pins.

6. The tool as in claim 5, wherein the stationary portion is sized for insertion between the securing pin and an associated mounting bracket.

7. The tool as in claim 4, further comprising a means for sensing the angle of separation of the tines of the associated cotter pin when the hammer is in the second position.

8. The tool as in claim 1, wherein the symmetrical arcuate end comprises a first arcuate portion and a second arcuate portion forming an angle of about 45 degrees at the vertex.

9. The tool as in claim 1, wherein a thickness of the stationary portion is less than about 0.5 inches.

10. A method for impact forming a cotter pin comprising:
    inserting a cotter pin having a head and two tines into a securing pin aperture, wherein the tines of the cotter pin extend through the securing pin aperture; aligning an impact forming tool with the head of the cotter pin at an orientation pin on the impact forming tool wherein the orientation pin positions the cotter pin; a stationary portion being connected to a handle at a proximate end portion; two anvil pins positioned on a face of the stationary portion between the proximate end portion and the orientation pin; the orientation pin positioned on a distal end portion of the face of the stationary portion; aligning the impact forming tool wherein the securing pin fits through an alignment aperture in the impact forming tool; actuating the impact forming tool for moving a hammer portion of the impact forming tool linearly along the face of the stationary portion of the impact forming tool; and simultaneously separating the two tines of the cotter pin.

11. The method as in claim 10, wherein simultaneously separating the two tines of the cotter pin comprises bending the two tines to a predetermined angle.

12. The method as in claim 11, wherein the predetermined angle is between about eighty degrees and about one hundred ten degrees.

13. The method as in claim 11, further comprising sensing the bend angle of the tines of the cotter pin after actuating the impact forming tool to determine if the two tines of the cotter pin are bent to the predetermined angle.

14. The method as in claim 10, wherein the two tines of the cotter pin are the same length.

15. The method as in claim 10, wherein actuating the impact forming tool comprises one of a hydraulic actuating force, a pneumatic actuating force, an electrical actuating force and a manual actuating force.

16. A system for securing an assembly with a cotter pin comprising:
    a cotter pin with a head and two tines;
    an impact forming tool comprising;
       a handle configured to receive an operating force;
       a stationary portion with a face and connected to the handle at a proximate end;
       an orientation pin positioned on a distal end of the stationary portion for receiving the head of the cotter pin;

two anvil pins positioned on the stationary portion between the proximate end and the orientation pin; and a hammer portion communicating with the operating force; the hammer portion configured to move linearly across the face of the stationary portion from a first position to a second position; the hammer portion having a symmetrical arcuate end, wherein a vertex of the symmetrical arcuate end is positioned to separate the two tines of the cotter pin between the two anvil pins when the hammer portion is in the second position.

17. The system as in claim 16, further comprising a sensing device for sensing the presence and bend angle of the tines of the cotter pin.

18. The system as in claim 16, wherein the source of operation force is one of a pneumatic force, a hydraulic force, an electrical force and manual force.

19. The system as in claim 16, wherein the two tines of the cotter pin are the same length.

* * * * *